United States Patent [19]

Takagi et al.

[11] Patent Number: 5,181,057
[45] Date of Patent: Jan. 19, 1993

[54] LENS-FITTED PHOTOGRAPHIC FILM PACKAGE

[75] Inventors: Junichi Takagi; Norio Hirasaki, both of Saitama, Japan

[73] Assignee: Fuji Photo Film Co., Ltd., Kanagawa, Japan

[21] Appl. No.: 667,758

[22] Filed: Mar. 11, 1991

[30] Foreign Application Priority Data

Mar. 9, 1990 [JP] Japan ............... 2-24157[U]
Mar. 9, 1990 [JP] Japan ............... 2-24158[U]
Mar. 9, 1990 [JP] Japan ............... 2-24159[U]
Mar. 9, 1990 [JP] Japan ............... 2-24160[U]

[51] Int. Cl.⁵ .............................. G03B 31/26
[52] U.S. Cl. .......................... 354/94; 354/250; 354/288
[58] Field of Search ............. 354/159, 94, 95, 96, 354/98, 99, 288, 233, 250, 254, 75, 76, 195.12, 81, 82

[56] References Cited

U.S. PATENT DOCUMENTS

| | | | |
|---|---|---|---|
| 3,888,568 | 6/1975 | Norris et al. | 354/195.12 X |
| 3,984,854 | 10/1976 | Wolcott | 354/288 |
| 4,866,470 | 9/1989 | Arai et al. | 354/288 |
| 4,918,477 | 4/1990 | Matsuda et al. | 354/288 |
| 5,028,946 | 7/1991 | Shinozaki et al. | 354/250 |

*Primary Examiner*—Michael L. Gellner
*Assistant Examiner*—Howard B. Blankenship
*Attorney, Agent, or Firm*—Young & Thompson

[57] ABSTRACT

A film package comprises an exposure frame member having a first rectangular opening disposed directly before the film for defining an exposed area of the film. A light-shielding member having a second rectangular opening for allowing only necessary exposure light to travel toward the first opening therethrough, is mounted on the exposure frame member before the exposure frame member is mounted on the rear side of an exposure chamber, on the front of which a taking lens system is mounted. A pair of positioning members is formed on the front wall of the film package integrally therewith, for designating the position of the user's fingers when the film package is gripped. A between-the-lenses shutter includes a V-shaped shutter blade of which one end is pivoted and the other end opens and closes the aperture, and a connecting lever pivotally mounted on the side of the V-shaped blade opposite the spacing member, one end of the connecting lever being engaged with the elbow of the V-shaped blade, and the other end of the connecting lever being struck by an actuating lever upon depression of a shutter release button. The connecting lever overlaps the V-shaped blade in an area from the elbow to the one end of the V-shaped blade, so that the shutter blade will not oscillate in the direction of the optical axis.

17 Claims, 8 Drawing Sheets

LENS-FITTED PHOTOGRAPHIC FILM PACKAGE

FIELD OF THE INVENTION

The present invention relates to a lens-fitted photographic film package which is previously loaded with a photographic film and in which simple exposure mechanisms such as a taking lens, a shutter, a film advancing mechanism and the like are incorporated. The lens-fitted photographic film package is hereinafter called simply a film package. The present invention relates especially to a film package for panoramic photography.

BACKGROUND OF THE INVENTION

Film packages are now on the market which are a single-use throwaway camera directed to make it possible to take pictures whenever desired without buying or carrying about an expensive and heavy camera. A single-use disposable camera must be cheap and light in weight, so that the essential parts of the film package are made from synthetic resin materials, and the number of necessary parts thereof is reduced so as to minimize the material cost and the weight thereof.

A single-use disposable camera for panoramic photography has been marketed by Eastman Kodak Co., in which a wide-angle lens system having a short focal length of about 25 mm is used as a taking lens, and the exposed area of the film is defined by a horizontally extended exposure frame 12 ×36 mm in size. Upon printing, the 12×36 mm picture frame is enlarged at a magnification twice the standard magnification for a standard 24×36 mm picture frame of 35 mm film. As a result, a print twice as long as a standard size print is provided.

The taking lens system of the above-described panoramic camera comprises a wide angle lens system composed of two lenses, the spacing between these lens elements being maintained constant by means of a spacing ring. Furthermore, because the principal point of the taking lens system lies between these lenses, an aperture stop member for defining the aperture size (the size of exposure opening) and a shutter blade for opening and closing the exposure opening are also disposed between these lenses. Consequently, the actual spacing between the lenses is defined by the thickness of the spacing ring and the aperture stop member. The spacing ring and the shutter blade of the Kodak panoramic camera is shown in FIG. 9.

As shown, the known shutter blade 85 is of V-shape and can pivot about an axle 91 when one end 86 thereof is struck by an actuating lever 87, whereby the other end 88 opens and closes an exposure opening 89 formed in an aperture stop member 94. An arm portion between the elbow 90 and the other end 88 is curved along a circular arc concentric with the axle 91, so that the shutter blade 85 can pivot through a narrow cut-out 93 of the spacing ring 92 that is only slightly wider than the arm portion, into and out of a position occluding the exposure opening 89.

However, since the spacing between the two lenses should be maintained precisely constant, not only the spacing ring 92 but also the aperture stop member 94 must be formed with great accuracy, which increases the cost of these parts. In addition to this, the assembling of these parts is cumbersome.

The shutter blade 85 is preferably formed as a single element, but the other end 88 tends to oscillate in the optical axis direction due to the shock applied to the shutter blade 85 when the one end 86 is struck by the actuating lever 87, because the portion from the axle 91 to the other end 88 is long and narrow. Such oscillation makes the other end 88 of the shutter blade 85 rub against the aperture stop member 94 and/or a lens disposed on the front of the spacing ring 92, which causes imprecision of exposure.

On the other hand, the panoramic camera as described above can be constructed from elements similar to those of disposable cameras for standard photography, except for the wide angle taking lens system and the 12×36 mm picture frame. For this reason, the Kodak panoramic camera has a main body section for a standard picture frame, and a separate frame member having an opening of 12×36 mm is mounted in the main body section, so that the main body section can be produced efficiently.

Furthermore, the frame member also functions as a light-shielding frame for shielding the film surface from stray light beams, instead of a light-trapping member such as plush that is cemented on the inner surface of the main body section, so as to eliminate the cementing step and thus lower the cost of the disposable camera.

The frame member is made from synthetic resin material by molding, but it is impossible to form the frame member as a single body by molding, because the frame member must have not only a first opening for defining the size of the picture frame but also a second opening for blocking out stray light beams. For this reason, the frame member is divided along a horizontal line into two parts, and these upper and lower parts are molded individually and are attached to each other prior to being mounted in the main body section.

However, because such a frame member divided into upper and lower parts has a joint that extends across the first and second openings, the upper and lower parts must be formed with great accuracy so that light may not leak through the joint. The need for great accuracy increases the cost. Furthermore, it is necessary to take care not to separate the two parts from each other when mounting the compound frame member in the main body section. Therefore, the efficiency of manufacturing is reduced.

In a camera having a wide angle taking lens system such as a panoramic camera, the user when gripping the camera tends to place his fingers carelessly in the photographic field. In order to avoid this, the above-described Kodak panoramic camera is provided with a hood surrounding the taking lens and projecting forward from the front surface of the camera. The hood is externally mounted on the camera body.

However, mounting such a separate hood on the front of the camera will increase the number of parts and the number of assembling steps, which is unfavorable to lowering the cost for the camera.

SUMMARY OF THE INVENTION

In view of the foregoing, one object of the invention is to provide a film package having an improved frame member that can be produced at a low cost and can be easily mounted in the film package.

Another object of the invention is to improve the film package such that the fingers gripping the film package may not be carelessly inserted in the photographic field.

Still another object of the invention is to provide a simple and inexpensive spacing ring and aperture stop member between two lenses of a taking lens system.

A further object of the invention is to provide a between-the-lenses shutter for the taking lens system, of which a V-shaped shutter blade will not oscillate in the optical axis direction when struck by an actuating lever.

To achieve the above objects, a film package of the invention comprises an exposure frame member having a first rectangular opening disposed directly before the film for defining an exposed area of the film extending from a film supply chamber to a film take-up chamber. The exposure frame member is fitted on the rear side of an exposure chamber on the front of which a taking lens system is mounted. Furthermore, a light-shielding member having a second rectangular opening is fitted on the front side of the exposure frame member. The second rectangular opening allows only necessary exposure light from the taking lens system to travel toward the first rectangular opening.

Because the first and second openings are not intersected by a joint, there is no need to prevent leakage of light through such a joint, and no need for high accuracy of manufacture. The light-shielding member can be securely fitted on the exposure frame member before the exposure frame member is mounted in the exposure chamber, and so the assembling of these parts becomes easy.

The film package of the invention further comprises a pair of positioning members formed on the front wall of the film package integrally therewith, for designating the position of fingers when the film package is gripped for photographing. The positioning members prevent insertion of the fingers into the photographic field and can be provided at low cost.

According to the invention, a spacing member disposed between two adjacent lenses of the taking lens system for maintaining the spacing between the two lenses is formed with an aperture for defining the size of the exposure opening, so that the conventional aperture stop member can be eliminated. Therefore, the number of parts is reduced, and only the spacing member need be formed accurately.

A between-the-lenses shutter of the invention comprises a V-shaped shutter blade of which one end is pivoted and the other end slides on a recessed surface of the spacing member so as to open and close the aperture formed in the recessed surface of the spacing member, and a connecting lever pivotally mounted on the opposite side of the V-shaped blade from the spacing member, one end of the connecting lever being engaged with the bent portion of the V-shaped blade, whereas the other end of the connecting lever projects into the path of an actuating lever, so that the actuating lever strikes this end of the connecting lever upon depression of a shutter release button. The connecting lever at least partially overlaps the V-shaped blade in a region from the bent portion to the one end of the V-shaped blade when the connecting lever is swung to move said V-shaped blade so as to open and close said aperture. Accordingly, the other end of the shutter blade will not oscillate in the optical axis direction when moved to open and close the aperture, because the shutter blade is not directly struck by the actuating lever, and the connecting lever always overlaps the shutter blade and gently holds it from the front side thereof.

BRIEF DESCRIPTION OF THE DRAWINGS

Other objects and advantages of the invention will become apparent from the following description taken in conjunction with preferred embodiments shown in the accompanying drawings, in which the same or like parts are designated by the same reference numerals throughout the drawings, in which.

DETAILED DESCRIPTION OF THE PREFERRED EMBODIMENTS

Figure 1:
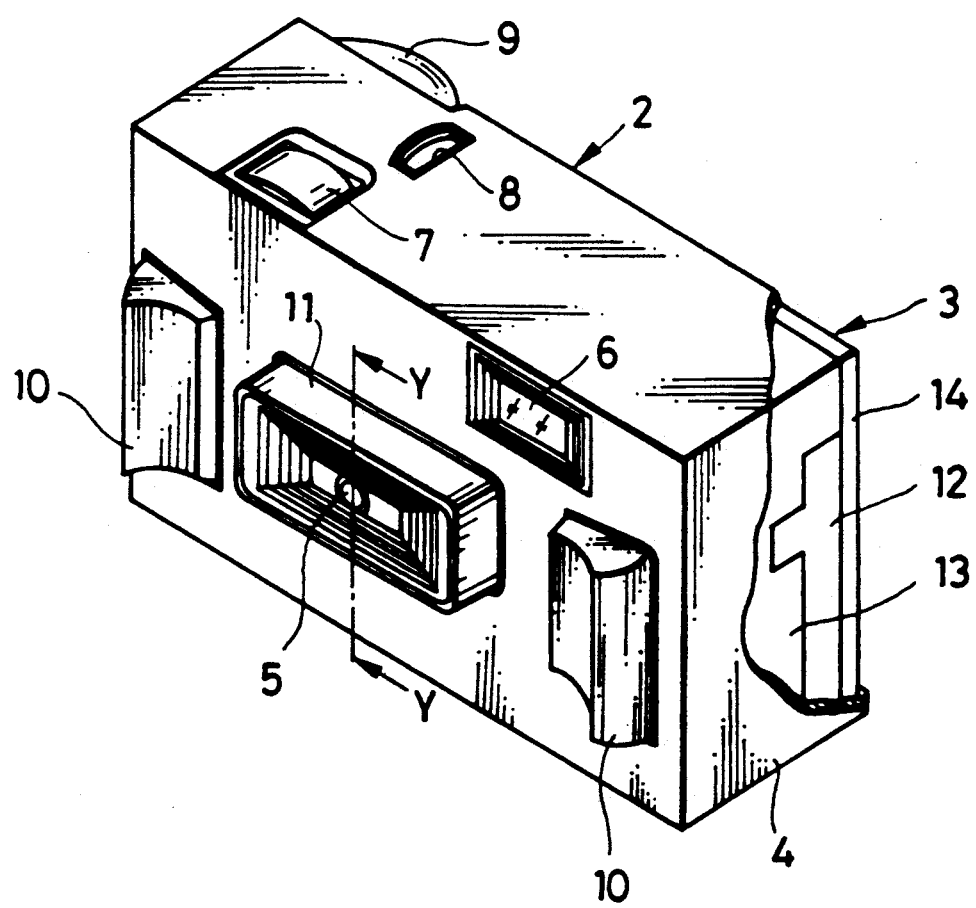
FIG. 1 is a perspective view of a film package according to a first embodiment of the present invention.

FIG. 1 shows the outer appearance of a film package for panoramic photography according to a first embodiment of the present invention. The film package 2 comprises a package body 3 and an outer casing 4 encasing the package body 3. Simple exposure mechanisms such as a taking lens system 5, a viewfinder window 6, a release button 7, a counter window 8, a film advancing wheel 9, and so forth are incorporated in package body 3. The outer casing 4 is made of cardboard or the like and is formed with openings for exposing the above exposure mechanisms and a pair of grips 10 and a lens hood 11 formed on the front of the package body 3. As described in detail hereinafter, the film package 2 can take a picture image of 12×36 mm size on a 35 mm film previously loaded in the package body 3.

Figure 2:
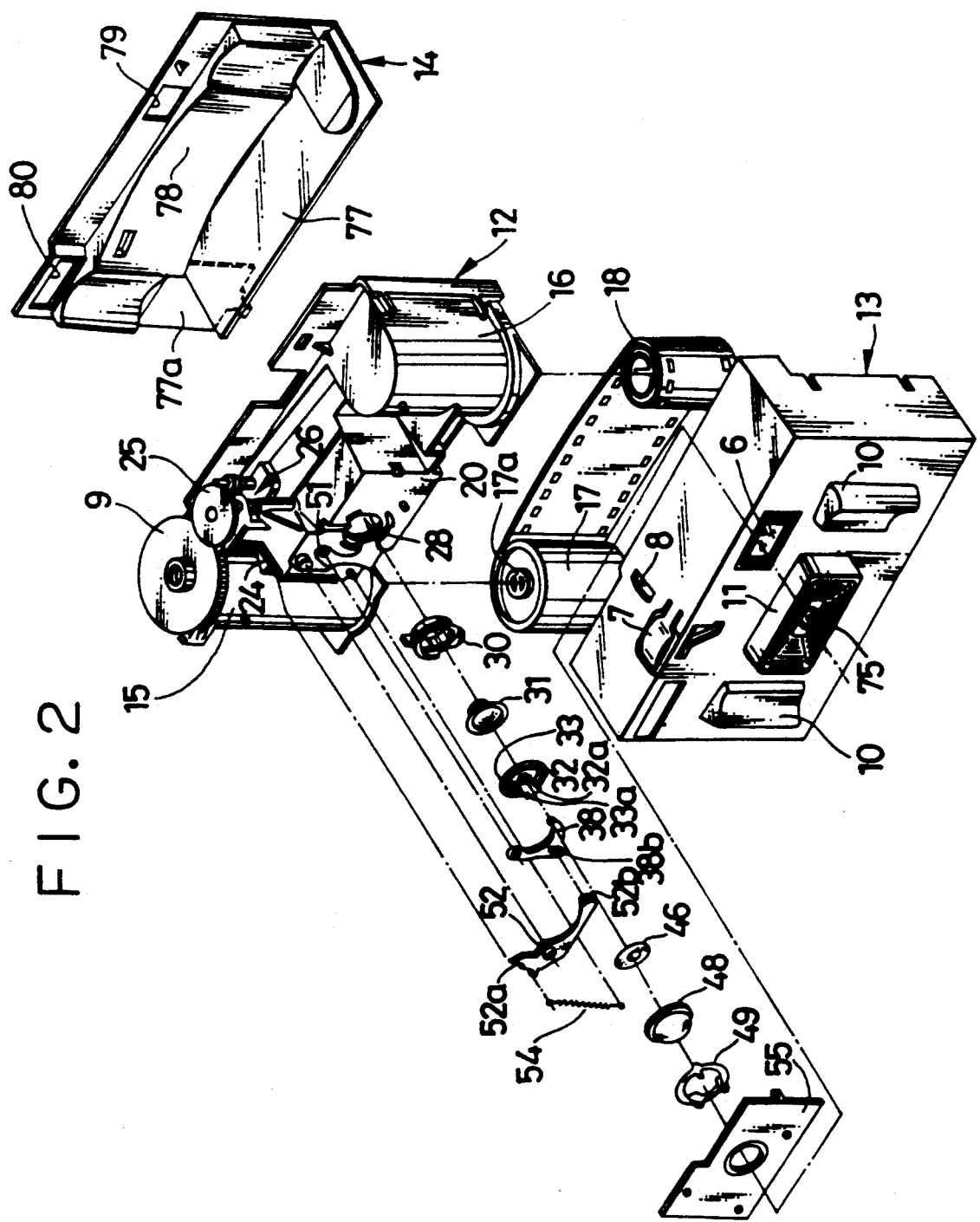
FIG. 2 is an exploded view of the film package of FIG. 1.
Figure 3:
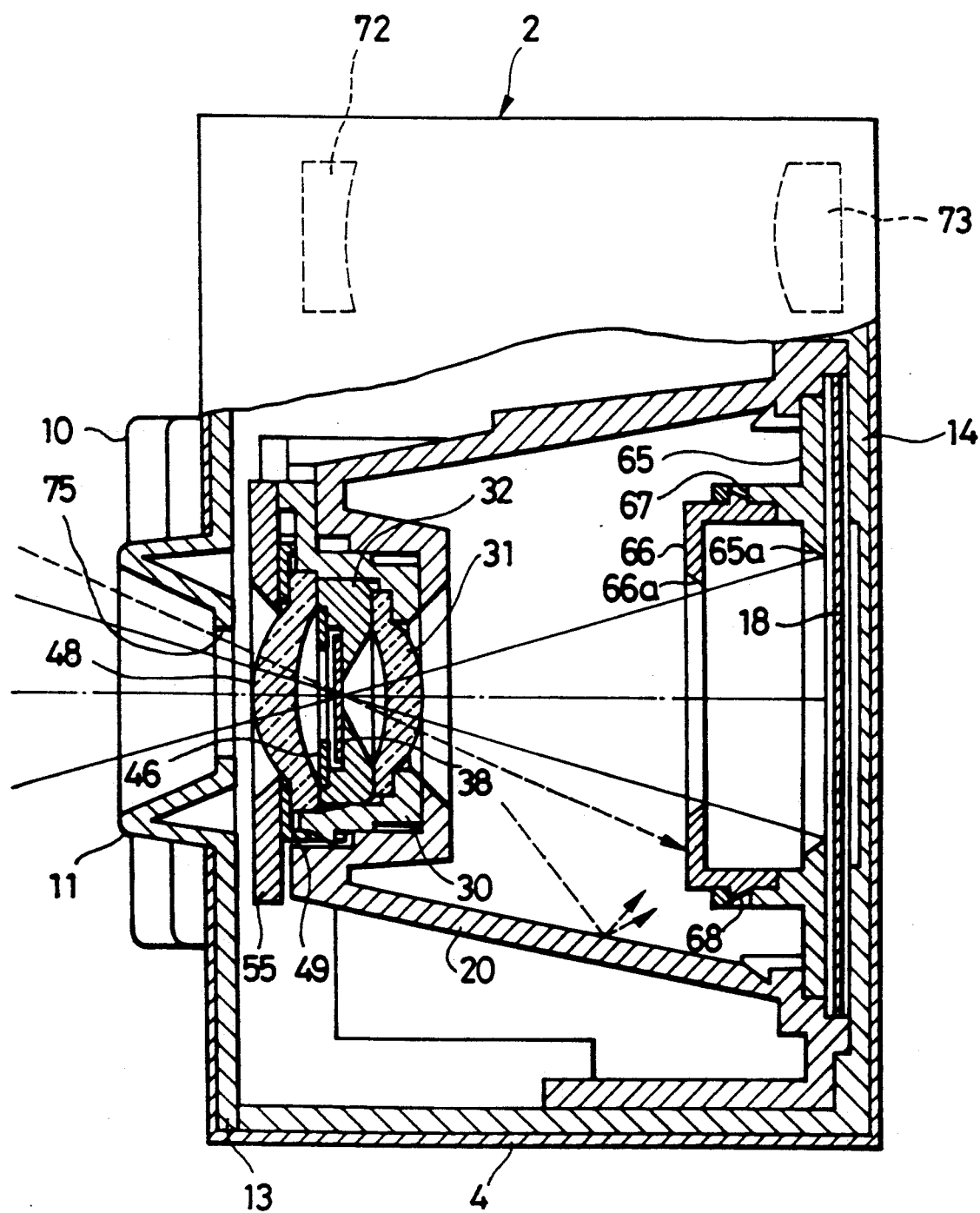
FIG. 3 is a vertical section of the film package taken along line Y—Y of FIG. 1.

As is shown in FIGS. 2 and 3, the package body 3 comprises a main body section 12, a front cover section 13 and a rear cover section 14 each of which is substantially formed as one body made of light-tight plastic, that is, synthetic resin material. The main body section 12 is formed with a film container chamber 15 and a film roller chamber 16 on opposite horizontal sides of an exposure chamber 20. The film container chamber 15 holds a film container 17 with a spool 17a, whereas the film roll chamber 16 holds a roll of film 18 which is pulled out from the film container 17 and wound into a roll at the factory prior to assembly of the package. One end of the film 18 is attached to the spool 17a.

The film advancing wheel 9 with knurling on its periphery is mounted on the top of the film container chamber 15 such that a winding shaft 9a of the film advancing wheel 9 projects into the film container chamber 15 (see FIG. 4) and engages with spool 17a of the film container 17. By rotating the film advancing wheel 9 counterclockwise, the spool 17a is rotated to wind the film 18 back into the film container 17 frame by frame as photography proceeds.

While the film 18 is thus advanced, a sprocket wheel 19 (see FIG. 4) engaging with perforations of the film 18 is rotated by the movement of the film 18, such that the sprocket wheel rotates one revolution for each film advance by one picture frame. A shutter actuating mechanism 26 including the sprocket wheel 19, an actuating lever 24, a counter disc 25, a connecting lever 52 and so forth is mounted on the main body section 12 such that the tip of the actuating lever 24 moves to the right in FIG. 2, upon depression of the release button 7, thereby actuating a shutter blade 38 as described in detail below.

The main body section 12 is formed in the front with an opening 28 into which a lens holder 30 is fitted. The lens holder 30 holds a rear lens 31, a spacing ring 32, the shutter blade 38, a shutter cover 46, and a front lens 48 inserted therein sequentially in this order from the rear, all these being securely held in the lens holder 30 by fitting a securing ring 49 onto the lens holder 30 as is shown in FIG. 3. The thickness of the spacing ring 32 defines the spacing between the front and rear lenses 48 and 31 such that the taking lens system 5 composed of these lenses has a wide angle of view (about 75°) that is suitable for panoramic photography.

Figure 5:
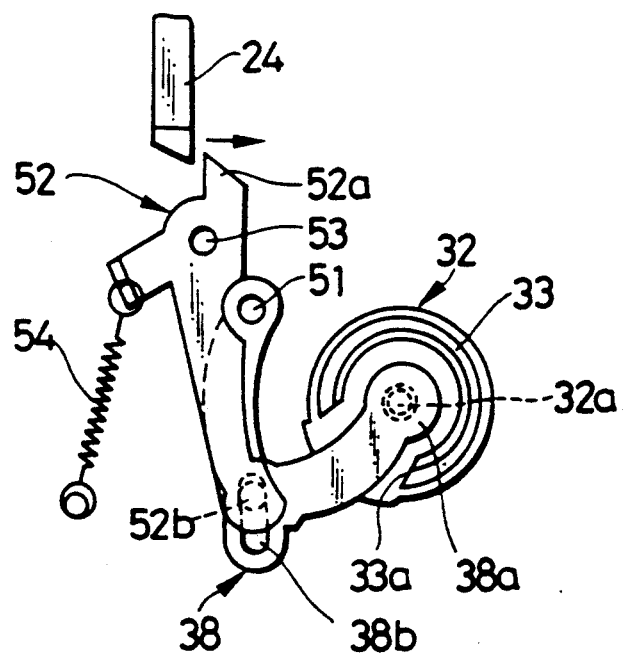
FIGS. 5 and 6 show parts of a shutter device of the film package.
Figure 6:
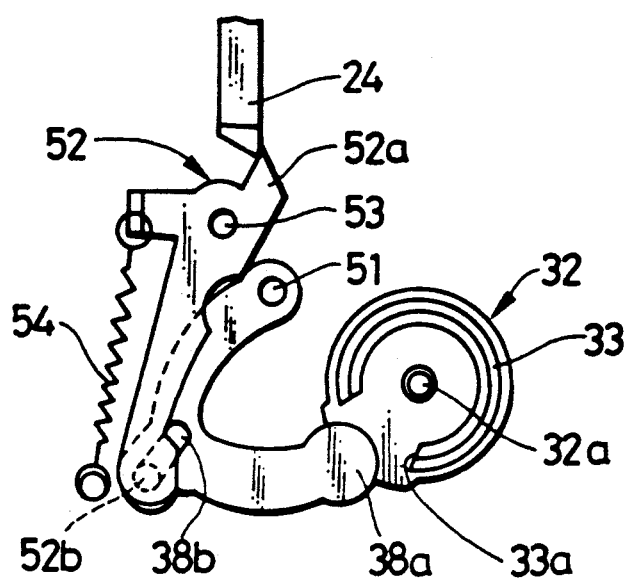

As illustrated in greater detail in FIGS. 5 and 6, the spacing ring 32 is formed at the center with an aperture 32a limiting the aperture size of the taking lens 5. Surrounding the aperture 32a, a rib portion 33 is formed for maintaining the spacing between the front and rear lenses 48 and 31 constant. The rib portion 33 has a cut-out 33a through which the shutter blade 38 is moved in and out so as to open and close the aperture 32a.

The shutter blade 38 is of substantially V-shape, and one end is pivotally mounted on a pin 51 formed integrally on the front of the main body section, whereas the other end forms a portion 38a for closing the aperture 32a. The portion between the end portion 38a and the elbow of the V-shaped shutter blade 38 is curved along a circular arc coaxial with the pin 51, so that the cut-out 33a need not be wide for enabling the shutter blade 38 to pivot about the pin 51 therethrough. This construction is preferable to keep the interior of the taking lens system 5 dust-free.

The shutter blade 38 normally closes the aperture 32a, but opens it when the actuating lever 24 strikes the connecting lever 52. The connecting lever 52 is pivotally mounted on a pin 53 formed on the front of the main body section 12, and is urged by a spring 54 to swing counterclockwise. One end 52a of the connecting lever 52 projects into the path of the actuating lever 24, while the other end is formed with a pin 52b which engages in a slot 38b formed in the elbow of the shutter blade 38. The connecting lever 52 extends partially over the shutter blade 38, that is, from the pin 51 to the elbow. When the actuating lever 24 strikes the end 52a while moving to the right as seen in FIGS. 5 and 6, the connecting lever 52 pivots clockwise against the action of spring 54 and thereafter returns to the initial position shown in FIG. 5 under the force of spring 54. When the connecting lever 52 pivots to and fro, the shutter blade 38 is caused to pivot about the pin 51 back and forth by the motion transmitted through engagement of the pin 52b in the slot 38b. As a result, the end portion 38a opens and then closes the aperture 32a, thereby making an exposure.

The shutter cover 46 prevents the end portion 38a from oscillating in the direction of optical axis of the taking lens system 5, which otherwise would occur when the shutter blade 38 pivots. The shutter cover 46 also shields the end portion 38a and the aperture 32a from dust.

The shutter blade 38 is mounted on the main body section 12 after being assembled with the lens holder 30 with its taking lens system 5, and then the actuating lever 52 is mounted thereon. A holding plate 55 is mounted on the front of these assemblies for preventing the removal of these assemblies from the main body section 12.

Figure 4:
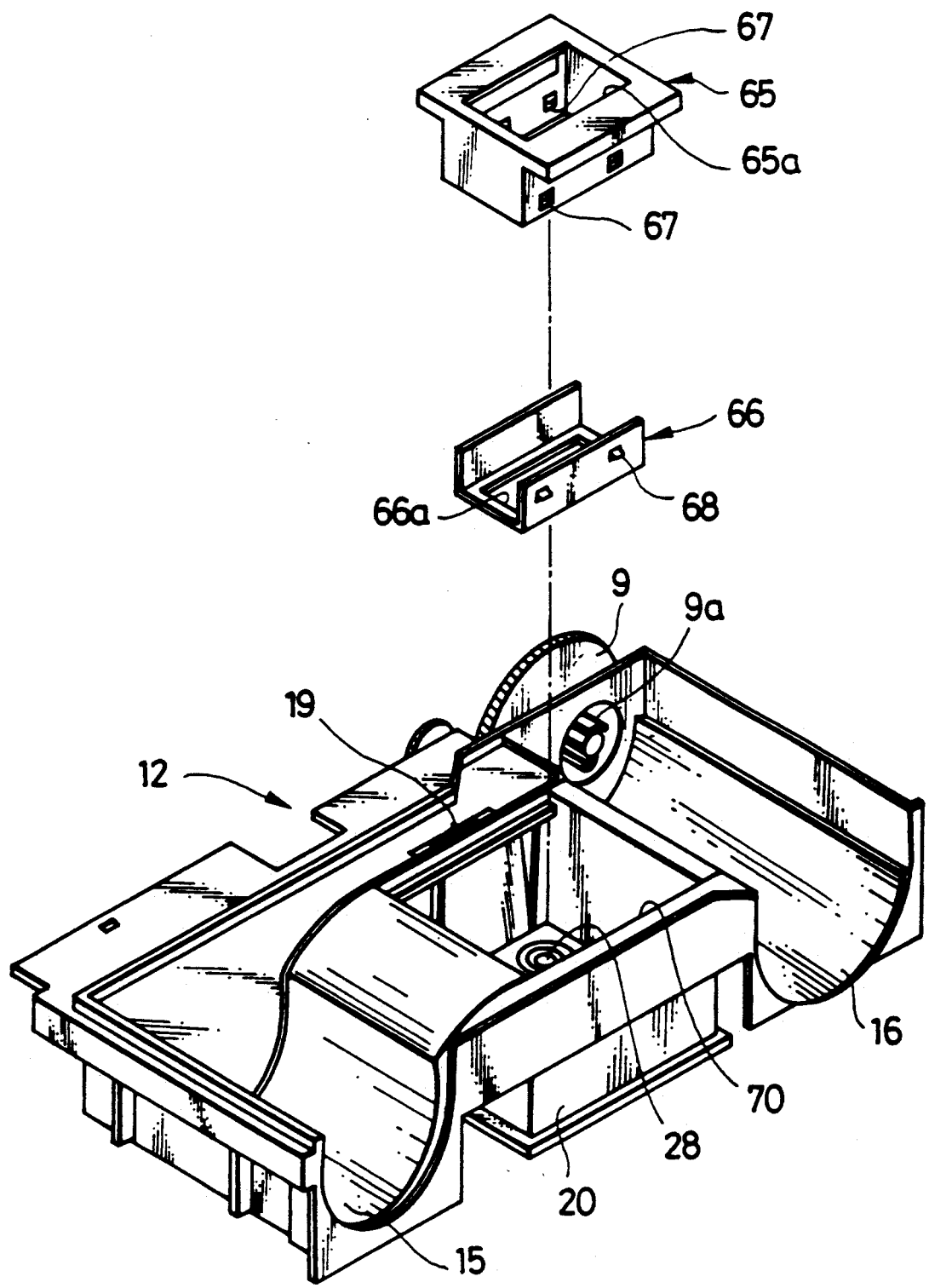
FIG. 4 is an exploded rear perspective view of the main body section of the film package.

On the rear side of the main body section 12, an exposure frame 65 is provided, as shown in FIGS. 3 and 4, for defining the exposed area, that is, the size of a picture frame of the film 18. An opening 65a of the exposure frame is 12×36 mm in size, so that the picture frame is substantially 12×36 mm, which is smaller in height than a standard picture frame of 35 mm film. The exposure frame 65 is attached to a light-shielding frame 66 having a front opening 66a. The size of the front opening 66a is such that the light-shielding frame 66 masks the light beams beyond the range between two solid lines shown in FIG. 3 which extend from the principal point of the taking lens system 5 toward the top and bottom margins of the opening 65a. The light-shielding frame 66 also shields the film 18 from light beams reflected from the inner surface of the exposure chamber 20. In this way, images formed on the film surface are prevented from being fogged by extraneous light and flare.

As illustrated in FIG. 4, the exposure frame 65 is a rectangular tube formed by molding, and has small holes 67 in the opposite side walls thereof. The light-shielding frame 66 also is formed by molding as one body having three wall portions. The front wall portion is formed with the rectangular opening 66a, whereas each of the top and bottom wall portions has on its outer surface hooks 68 formed integrally therewith, so that the hooks 68 engage in the holes 67 when the light-shielding frame 66 is inserted in the front end of the exposure frame 65. After the light-shielding frame 66 is securely attached to the exposure frame 65, these members 65 and 66 are mounted as a unit in the rear opening of the exposure chamber 20 of the main body section 12, for example, by snap-in connection or welding.

It is to be noted that a rear opening 70 of the exposure chamber 20 is 24×36 mm in size, which is the standard size of a picture frame of 35 mm film, so that the main body section 12 without the exposure frame 65 can also be used as that of a film package for standard photography.

The front cover section 13 for covering the front of the main body section is formed with the viewfinder window 6, the release button 7, the counter window 8 and an opening 75 for the taking lens system 5. An inverted Galilean finder assembly including a concave lens 72 and a convex lens 73 is disposed behind the viewfinder window 6. Because the inverted Galilean finder has a horizontally wide optical field, it is possible to obtain a wide finder field corresponding to a panoramic photographic field without enlarging the viewfinder window 6.

Figure 7:
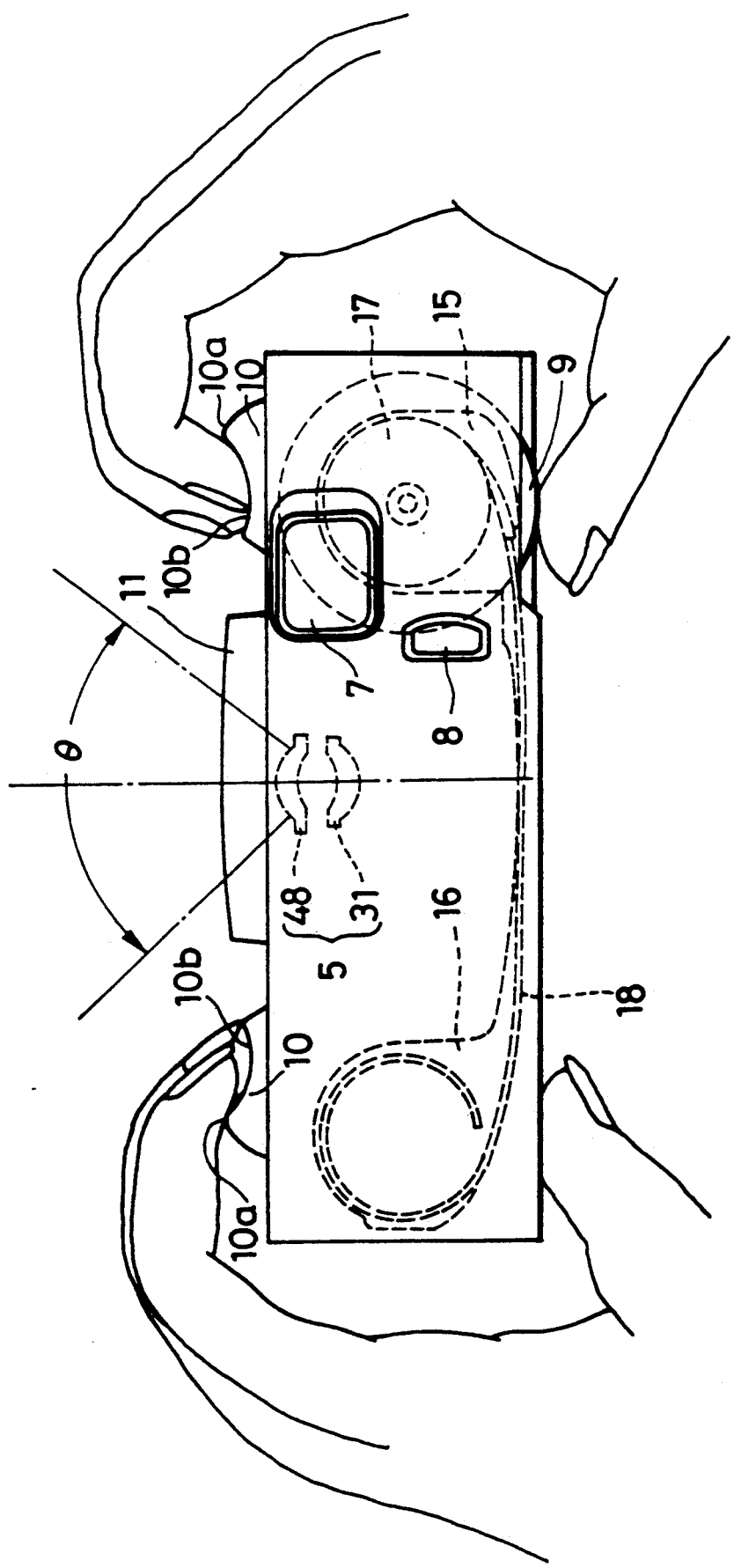
FIG. 7 is a schematic top plan view of the film package.

The hood 11 and the pair of grips 10 on the front wall of the front cover section 13 are formed integrally therewith. The hood 11 shields the taking lens system from stray light. The pair of grips 10 define the position of the fingers when handling the film package 2 to take pictures, as is illustrated in FIG. 7. Each grip 10 has a projection 10a and a recessed portion 10b, so that the fingertips fit into the recessed portions when gripping the film package on both sides. In this position, the fingers will not enter the view angle $\theta$ of the taking lens system 5. Therefore, by positioning the fingers on the pair of grips when handling the film package, it is possible to avoid blocking the photographic field with the fingers by mistake without the need to pay attention to the position of the fingers. The pair of grips 10 also contribute to securely gripping the film package and thus help the user to hold the camera steady.

The rear cover section 14 has a bottom wall portion 77 which closes the bottoms of the film container chamber 15 and the film roll chamber 16 when the rear cover section 14 is fitted to the rear side of the main body section 12. The rear cover section 14 further is formed with a look-in window 79 of the viewfinder, an opening 80 for exposing the film advancing wheel 9, and a film guide surface 78 for supporting the film 18 from the rear thereof. Left and right side portions of the film guide surface 78 form parts of the inner surfaces of the film container chamber 15 and the film roll chamber 16, respectively. The film guide surface 78 is slightly curved to be forwardly concave so that the film 18 in the exposure frame 65 is curved correspondingly. In this way, images formed on the film surfaces are prevented from suffering horizontal distortion. The rear cover section is attached to the main body section 12 after the film container 17 and the film 18 are inserted in the chambers 15 and 16, and thereafter, the sections 12 and 14 are light-tightly secured to each other for keeping the film 18 in a light-tight fashion. The bottom wall portion 77 is at least partially openable so as to facilitate the removal of the film container 17 containing the exposed film 18 from the film package body 3. In this embodiment, an area 77a forming the bottom wall of the film container chamber 15 is made as a lid.

The film package described above operates as follows:

Upon depression of the release button 7, the shutter driving mechanism 26 is released, and the actuating lever 24 moves from the cocked position shown in FIG. 5 rapidly to the right, thereby striking the end portion 52a of the connecting lever 52. As a result, the connecting lever 52 pivots clockwise against the force of the spring 54. Immediately after the actuating lever 24 passes over the end portion 52a, the connecting lever 52 returns to the initial position under the influence of the spring 54. The reciprocating motion of the connecting lever 52 is transmitted to the shutter blade 38 through the pin 52b and the slot 38a, so that the end portion 38a opens and then closes the aperture 32a.

Throughout the above cycle of movement of the shutter blade 38, the connecting lever 52 overlaps the shutter blade 38 between the axle 51 and the slot 38b. Therefore, the connecting lever 52 prevents oscillation of the shutter blade 38 in the direction of the optical axis even while the shutter blade 38 is moving rapidly, so that a stable exposure will be obtained. Furthermore, because the spacing ring 32 is formed as a high accuracy element by molding so as to maintain the spacing between the front and rear lenses 48 and 31 precisely constant, the shutter blade 38 can pivot swiftly and stably on the front surface of the spacing ring 32 while being gently pressed by the connecting lever 52 toward the front surface of the spacing ring 32. Accordingly, no other specific guide surface for the shutter blade 38 is necessary.

When the shutter blade 38 opens and closes the aperture 32a, a 12×36 mm sized picture frame is recorded on the film 18 by light passing through the taking lens system 5 and the openings 66a and 65a. The light-shielding frame 66 blocks extraneous light beams, so that flare and ghosts will not degrade the recorded image.

After the exposure, since the film advancing wheel 9 is unlocked, it is possible to wind up the film 18 by rotating the wheel 9. When the film 18 has been wound up by one frame, the sprocket wheel 19 has made one revolution. This one revolution of the sprocket wheel 19 moves a frame counter disc 25 by one step, whereby the shutter actuating mechanism 26 returns the shutter actuating lever 24 to its cocked position and, at the same time, locks the film advancing wheel 9 against further rotation. In this condition, the film package 2 is ready for the next exposure operation. The same operation as set forth above is repeated until all the frames have been exposed.

Figure 8:
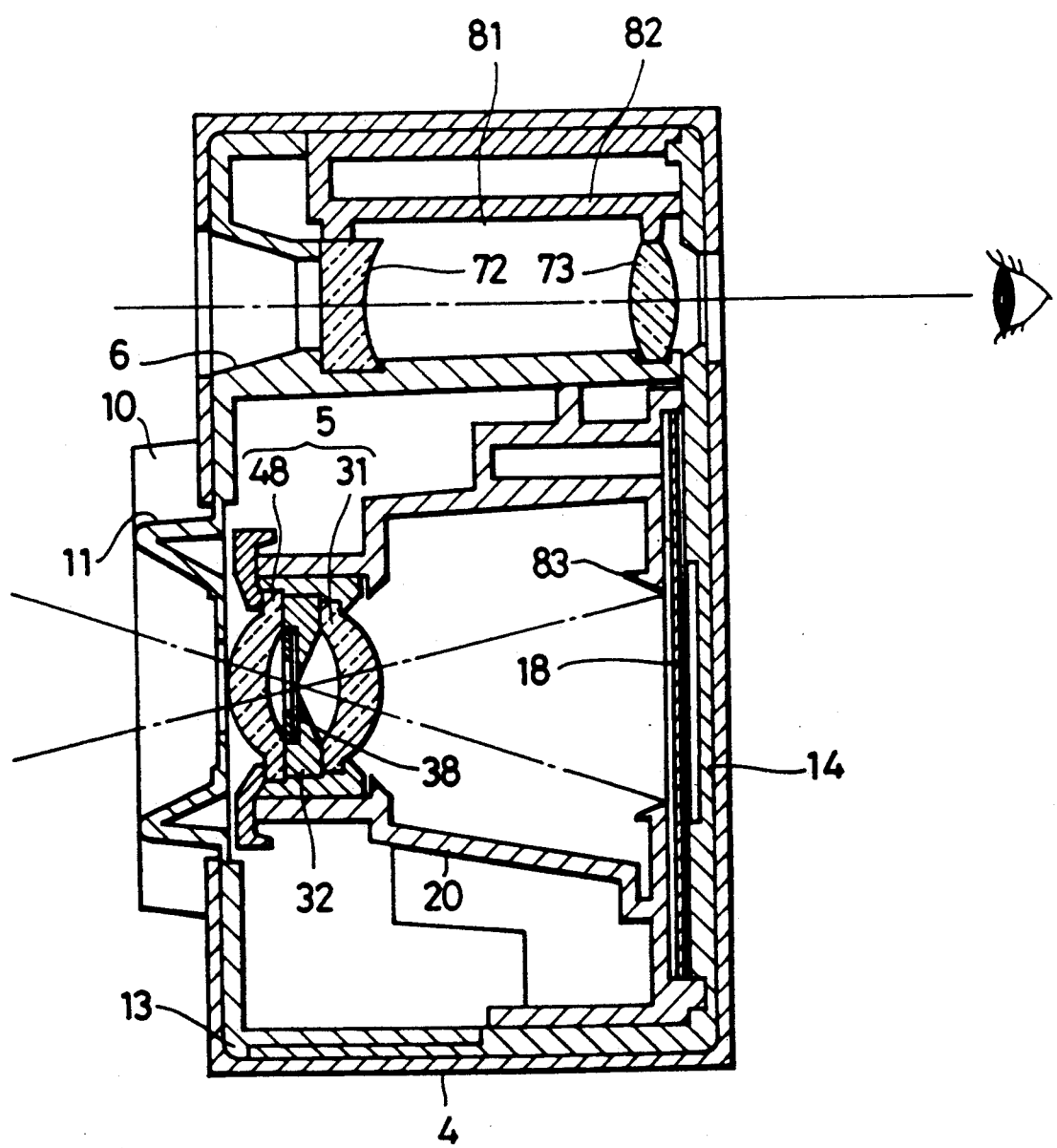
FIG. 8 is a vertical section of a film package according to a second embodiment of the invention.
Figure 9:
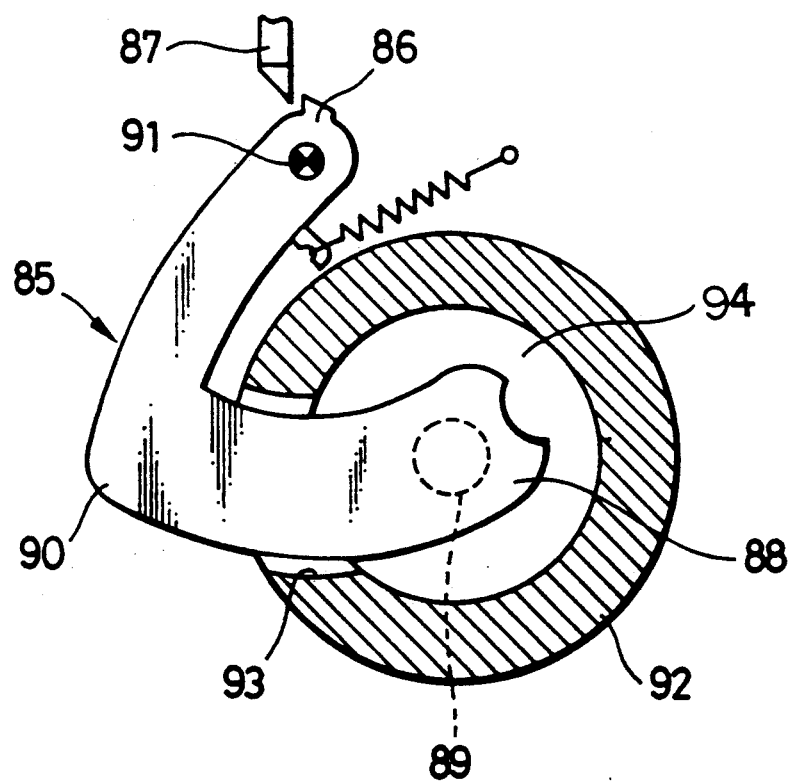
FIG. 9 is an explanatory view showing a conventional shutter device.

FIG. 8 shows another embodiment of the invention in which no light-shielding frame is provided, and an exposure frame having an opening 83 is formed integrally with an exposure chamber 20 of a main body section. The size of the exposure frame opening 83 is specific to panoramic photography. In this embodiment, the front cover section 13 has formed in the top wall thereof behind the viewfinder window 6 a chamber 81 for accommodating a concave lens 72 and a convex lens 73 of an inverted Galilean finder. The lenses 72 and 73 are securely held in the chamber 81 by being pressed downward by a top lid 82 of the chamber 81, which is snapped into the top wall of the front cover section 13 to close the chamber 81. The top surface of the lid 82 is flush with that of the top wall portion when snapped in. For easy understanding, the section shown in FIG. 8 is taken partially along the vertical plan including the optical axis of the taking lens system 5, and also along the vertical plane including the optical axis of the viewfinder 72, 73.

The invention has been described in detail with particular reference to preferred embodiments, but it will be understood that various modifications can be effected within the spirit and scope of the invention as claimed in the appended claims. For example, the shape of the grips 10 may be other than square, such as orthogonal or circular when viewed from the front of the film package. The projection 10a and the recessed portion 10b may be replaced by a plurality of ribs or fine projections. It is also possible to form a pair of recessed portions in the front of the front wall section 13 instead of the pair of grips 10. The shutter actuating mechanism and the shutter blade 38 can be adapted to a taking lens system composed of more than two lenses, between two adjacent lenses.

The present invention is not to be limited to a panoramic film package, but is applicable to other types of film packages or a cheap reusable camera.

What is claimed is:

1. A lens-fitted photographic film package comprising means defining a film supply chamber and a film take-up chamber, an unexposed photographic film rolled up in said film supply chamber and means to wind said film from said film supply chamber into said film take-up chamber, said lens-fitted photographic film package further comprising:

means defining an exposure chamber between said film supply chamber and said film take-up chamber;

a taking lens system mounted on the front of said exposure chamber;

an exposure frame member disposed directly before said film extending from said film supply chamber to said film take-up chamber, said exposure frame member having a first rectangular opening for defining an exposure area of said film; and a light-shielding member attached to said exposure frame member, said light-shielding member and said exposure frame member having interengageable hooks and holes such that said light-shielding member can be assembled on said exposure frame member by pushing said light-shielding member toward said first rectangular opening, said light-shielding member having a second rectangular opening forward of said first rectangular opening and through which only necessary exposure light from said taking lens system travels toward said first opening.

2. A lens-fitted photographic film package as defined in claim 1, wherein said exposure chamber has a third rectangular opening in a rear side thereof in which said exposure frame member carrying said light-shielding member is received, said first opening being in alignment with said third opening.

3. A lens-fitted photographic film package as defined in claim 2, wherein said third opening corresponds to a standard picture frame of 35 mm film, whereas said first and second openings correspond to a smaller picture frame.

4. A lens-fitted photographic film package as defined in claim 1, wherein said exposure frame member is shaped as a rectangular tube in whose rear end said first rectangular opening is formed.

5. A lens-fitted photographic film package as defined in claim 1, wherein said light-shielding member is comprised by a front wall portion having said second rectangular opening therein, and two opposite side wall portions, and is attached to a front end of said exposure frame member.

6. A lens-fitted photographic film package as defined in claim 1, further comprising a pair of positioning members for designating the position of fingers of the user when said lens-fitted photographic film package is gripped for photographing, said positioning members being formed as forwardly extending protrusions on a front wall of said lens-fitted photographic film package integrally therewith and preventing insertion of the fingers into the photographic field.

7. A lens-fitted photographic film package as defined in claim 1, wherein said taking lens system includes at least two lenses and a spacing member disposed between two adjacent said lenses for maintaining the spacing between said two lenses, said spacing member having an aperture therethrough.

8. A lens-fitted photographic film package as defined in claim 1, wherein said taking lens system and said first and second openings are adapted to take panoramic pictures.

9. A lens-fitted photographic film package containing an unexposed photographic film and mechanism for exposing said film, said lens-fitted photographic film package further comprising:

a taking lens system including at least two lenses; and
a spacing member disposed between two adjacent said lenses for maintaining the spacing between said two lenses, said spacing member having an aperture therethrough;
said shutter comprising:
an actuating lever which is released by release means;
a V-shaped blade of which one end is pivoted and the other end slides on a recessed surface of said spacing member so as to open and close said aperture; and a connecting lever swinging on the side of said V-shaped blade opposite said spacing member, one end of said connecting lever being engaged with an elbow of said V-shaped blade, whereas the other end of said connecting lever is struck by said actuating lever when said actuating lever is released, said connecting lever at least partially overlapping said V-shaped blade in an area from said elbow to said one end of said V-shaped blade when said connecting lever is swung to move said V-shaped blade so as to open and close said aperture.

10. A lens-fitted photographic film package containing an unexposed photographic film and mechanism for exposing said film, said lens-fitted photographic film package further comprising:

a pair of positioning members for designating the position of fingers of a user when said lens-fitted photographic film package is handles for photographing, said positioning members being formed on a front wall of said lens-fitted photographic film package integrally therewith and projecting forwardly thereof and having forward surfaces so shaped so as to define a rest position of the fingers on said forward surfaces thereby to prevent insertion of the fingers into the photographic field, said positioning members comprising a pair of grips each having a projection and a recessed portion, said projections being spaced farther apart than said recessed portions.

11. A lens-fitted photographic film package comprising means defining a film supply chamber and a film take-up chamber, an unexposed photographic film rolled up in said film supply chamber and means to wind said film from said film supply chamber to said film take-up chamber, said lens-fitted photographic film package further comprising:

means defining an exposure chamber between said film supply chamber and a film take-up chamber, said exposure chamber having in a rear side thereof a first rectangular opening for defining an exposure area of said film;

a taking lens system disposed in front of said exposure chamber; and a light-shielding member mounted inside said exposure chamber, said light-shielding member having a second rectangular opening forward of said first rectangular opening and through which only necessary exposure light from said taking lens system travels toward said first opening.

12. A lens-fitted photographic film package as defined in claim 11, wherein said taking lens system and said first and second openings are adapted to take panoramic pictures.

13. A lens-fitted photographic film package containing an unexposed photographic film and mechanism for exposing said film, said lens-fitted photographic film package further comprising:

a taking lens system including at least two lenses;
a shutter disposed between the lenses;
a spacing member disposed between two adjacent said lenses for maintaining a predetermined spacing between said two lenses;
there being an aperture extending through said spacing member, said aperture being disposed on the optical axis of said taking lenses and being adapted to be opened and closed by said shutter;

said spacing member having a recessed surface about said aperture, and said shutter sliding on said recessed surface;
said shutter comprising:
said shutter comprising:
release means;
an actuating lever which is released by said release means;
a V-shaped blade of which one end is pivoted and the other end slides on said recessed surface so as to open and close said aperture; and
a connecting lever swingably mounted on the side of said V-shaped blade opposite said spacing member, one end of said connecting lever being engaged with an elbow of said V-shaped blade, whereas the other end of said connecting lever is struck by said actuating lever when said actuating lever is released, said connecting lever at least partially overlapping said V-shaped blade in an area from said elbow to said one end of said V-shaped blade when said connecting lever is swung to move said V-shaped blade so as to open and close said aperture.

14. A lens-fitted photographic film package as defined in claim 13, and a spring which urges said connecting lever to close said aperture by said V-shaped blade.

15. A lens-fitted photographic film package as defined in claim 14, wherein said V-shaped blade is curved from said elbow toward said another end along a circular arc concentric with the rotational axis of said V-shaped blade.

16. A lens-fitted photographic film package containing an unexposed photographic film and mechanism for exposing said film, said lens-fitted photographic film package further comprising:
a taking lens system including at least two lenses;
a shutter disposed between the lenses;
a one-piece spacing member disposed between two adjacent said lenses for maintaining a predetermined spacing between said two lenses;
there being an aperture extending through said spacing member, said aperture being disposed on the optical axis of said taking lenses and being adapted to be opened and closed by said shutter;
said spacing member having rib means defining a recessed surface about said aperture, and said shutter sliding on said recessed surface through a gap in said rib means.

17. A lens-fitted photographic film package as defined in claim 16, said rib means being annular and having a coaxial annular recess therein of a diameter less than the diameter of said spacing member, and an annular shutter cover disposed in said annular recess, said shutter being disposed between said recessed surface and said shutter cover.

* * * * *